(12) United States Patent
Suzuki et al.

(10) Patent No.: US 12,552,290 B2
(45) Date of Patent: Feb. 17, 2026

(54) VEHICLE SYSTEM TO UTILIZE SURPLUS POWER

(71) Applicant: Honda Motor Co., Ltd., Tokyo (JP)

(72) Inventors: Kenta Suzuki, Tokyo (JP); Kenichi Shimizu, Tokyo (JP); Satoshi Oshima, Tokyo (JP); Yuki Fukunishi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 18/444,964

(22) Filed: Feb. 19, 2024

(65) Prior Publication Data

US 2024/0286527 A1    Aug. 29, 2024

(30) Foreign Application Priority Data

Feb. 24, 2023   (JP) ................................. 2023-027764

(51) Int. Cl.
*B60L 58/40*     (2019.01)
*B60H 1/00*      (2006.01)
(Continued)

(52) U.S. Cl.
CPC .......... *B60L 58/40* (2019.02); *B60H 1/00271* (2013.01); *B60L 1/003* (2013.01); *B60L 58/26* (2019.02); *B60L 58/27* (2019.02); *H01M 8/04029* (2013.01); *H01M 8/04925* (2013.01); *H01M 10/425* (2013.01);
(Continued)

(58) Field of Classification Search
CPC .......... B60L 58/40; B60L 1/003; B60L 58/26; B60L 58/27; B60H 1/00271; B60H 1/2221; B60H 2001/00307; B60H 1/00385; H01M 8/04029; H01M 8/04925; H01M 10/613;
(Continued)

(56) References Cited

U.S. PATENT DOCUMENTS

2017/0259806 A1*   9/2017   Kava .................... B60K 6/48

FOREIGN PATENT DOCUMENTS

JP            5754346 B2 *   7/2015
JP         2019149260 A *   9/2019
(Continued)

OTHER PUBLICATIONS

JP2019149260A english translation (Year: 2019).*
JP2021190310A english translation (Year: 2021).*
JP5754346B2 english translation (Year: 2015).*

*Primary Examiner* — James J Lee
*Assistant Examiner* — Brandon S Lee
(74) *Attorney, Agent, or Firm* — Duft & Bornsen, PC

(57) ABSTRACT

A vehicle system including a fuel cell, a power storage device storing a first power generated by the fuel cell and a second power regenerated by an electric motor, a first auxiliary machine and a second auxiliary machine driven by using at least one of the first power, the second power and a third power stored in the power storage device, and a microprocessor. The microprocessor is configured to perform determining switching of a power consumption mode between a first power consumption mode where a surplus power in the second power is consumed by the first auxiliary machine and the surplus power in the first power is consumed by the second auxiliary machine and a second power consumption mode where a surplus power in the first power and the second power is consumed by the second auxiliary machine.

9 Claims, 6 Drawing Sheets

(51) Int. Cl.
*B60H 1/22* (2006.01)
*B60L 1/00* (2006.01)
*B60L 58/26* (2019.01)
*B60L 58/27* (2019.01)
*H01M 8/04029* (2016.01)
*H01M 8/04858* (2016.01)
*H01M 10/42* (2006.01)
*H01M 10/613* (2014.01)
*H01M 10/615* (2014.01)
*H01M 10/625* (2014.01)
*H01M 10/63* (2014.01)
*H01M 16/00* (2006.01)

(52) U.S. Cl.
CPC ....... *H01M 10/613* (2015.04); *H01M 10/615* (2015.04); *H01M 10/625* (2015.04); *H01M 10/63* (2015.04); *H01M 16/006* (2013.01); *B60H 2001/00307* (2013.01); *B60H 1/2221* (2013.01); *H01M 2220/20* (2013.01); *H01M 2250/20* (2013.01)

(58) Field of Classification Search
CPC ............. H01M 10/615; H01M 10/625; H01M 16/006; H01M 2220/20; H01M 2250/20
See application file for complete search history.

(56) References Cited

FOREIGN PATENT DOCUMENTS

| | | | |
|---|---|---|---|
| JP | 2020087720 A | 6/2020 | |
| JP | 2021190310 A | * 12/2021 | .......... H01M 16/006 |

\* cited by examiner

VEHICLE SYSTEM TO UTILIZE SURPLUS POWER

CROSS-REFERENCE TO RELATED APPLICATION

This application is based upon and claims the benefit of priority from Japanese Patent Application No. 2023-027764 filed on Feb. 24, 2023, the content of which is incorporated herein by reference.

BACKGROUND OF THE INVENTION

Field of the Invention

This invention relates to a vehicle system mounted on a vehicle driven by a motor.

Description of the Related Art

Conventionally, as this type of system, there has been known a vehicle system mounted on a fuel cell vehicle. Such a system is disclosed, for example, in Japanese Unexamined Patent Publication No. 2020-087720 (JP2020-087720A). For example, when a fuel cell vehicle is traveling on a long downhill slope, brake torque is obtained by regenerative power generated from a motor of the vehicle. The generated regenerative power is charged into the secondary battery of the vehicle system. When the free capacity of the secondary battery is insufficient, the vehicle system causes a motor such as a compressor to consume a surplus of regenerative power.

However, in the fuel cell vehicle, in addition to the regenerative power, a surplus may be generated in the power generated by the fuel cell.

SUMMARY OF THE INVENTION

An aspect of the present invention is a vehicle system mounted on a vehicle driven by an electric motor, including: a fuel cell; a power storage device that stores a first power generated by the fuel cell and a second power regenerated by the electric motor; a first auxiliary machine and a second auxiliary machine driven by using at least one of the first power, the second power and a third power stored in the power storage device; and an electronic control unit including a microprocessor and a memory connected to the microprocessor. The microprocessor is configured to perform determining an auxiliary machine consuming a surplus power in the first power and the second power, when the surplus power generates in at least one of the first power and the second poser, and the microprocessor is configured to perform, and the determining including determining switching of a power consumption mode between a first power consumption mode where the surplus power in the second power is consumed by the first auxiliary machine and the surplus power in the first power is consumed by the second auxiliary machine and a second power consumption mode where the surplus power in the first power and the second power is consumed by the second auxiliary machine.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

In a fuel cell vehicle equipped with a vehicle system according to an embodiment of the present invention, a motor for traveling is driven using at least one of electric power (FC power) generated and output by a fuel cell (hereinafter, sometimes referred to as FC) and electric power (battery power) stored in a secondary battery of the vehicle system. Further, electric power (regenerative power) generated during regeneration from the traveling motor is stored in the secondary battery of the vehicle system. When the free capacity of the secondary battery is insufficient, the vehicle system operates an electric device called an auxiliary machine to consume surplus power. In particular, even in a case where both the FC power and the regenerative power have a surplus, the surplus power in both is appropriately consumed. Details of such a vehicle system will be described below with reference to the drawings.

Figure 1:
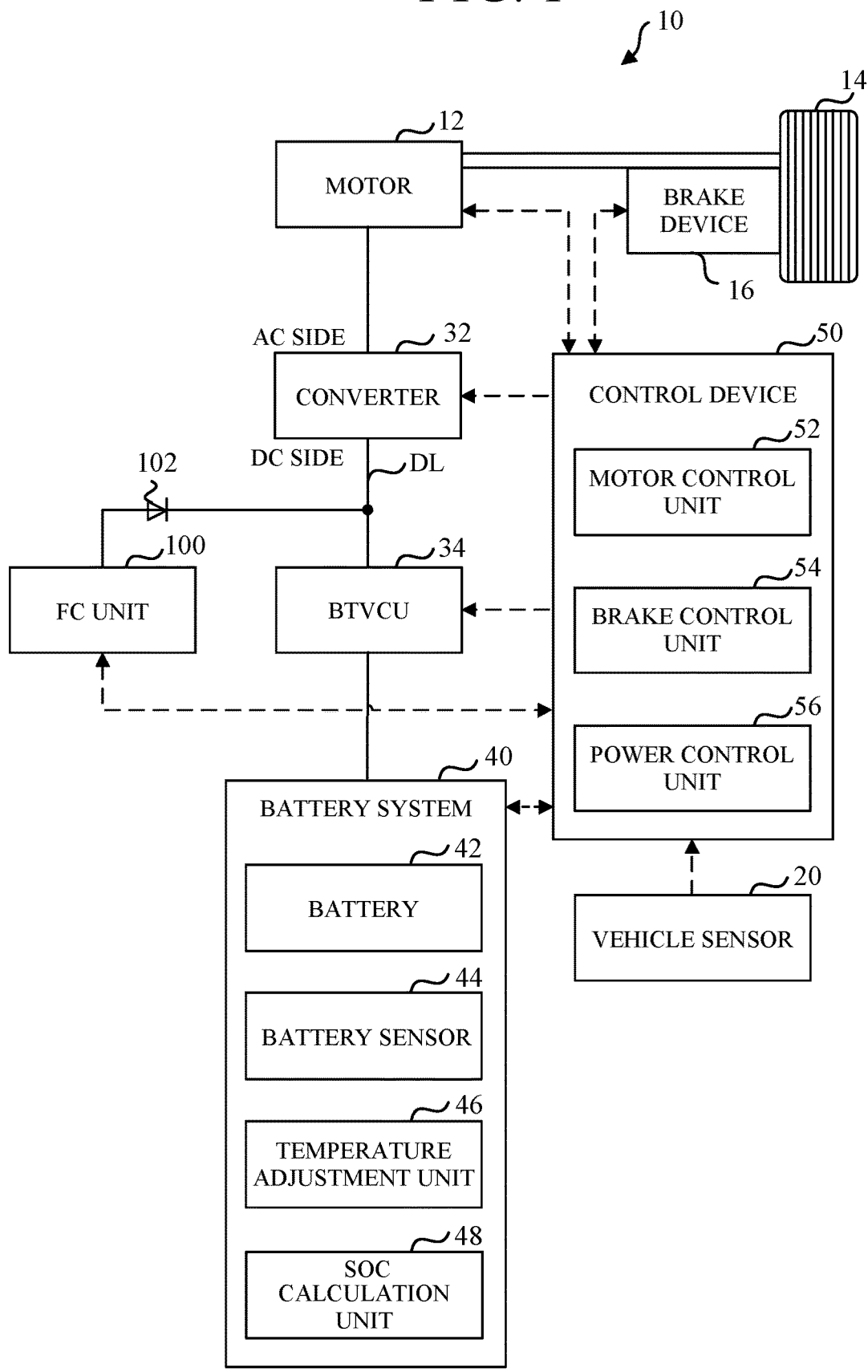
FIG. 1 is a diagram illustrating schematically a configuration of a fuel cell vehicle according to an embodiment of the invention.

FIG. 1 is a schematic configuration diagram illustrating an example of a vehicle system 10 according to an embodiment of the invention. The vehicle system 10 is mounted on a fuel cell vehicle as an example of an electric vehicle driven by a motor 12. The vehicle system 10 includes at least the motor 12 for traveling, a driving wheel 14, a brake device 16, a vehicle sensor 20, a converter 32, a battery voltage control unit (BTVCU) 34, a battery system (power storage device) 40, a control device (an electronic control unit) 50, and an FC unit 100. A diode 102 is disposed between the FC unit 100, the converter 32, and the BTVCU 34 to prevent backflow. A solid line connecting the blocks in FIG. 1 indicates an electrical connection, and a broken line connecting the control device 50 and the blocks exemplifies a direction of a signal.

The motor 12 is, for example, a three-phase AC motor. The rotor of the motor 12 is connected to the driving wheel 14. The motor 12 outputs the driving force to the driving wheels 14 using at least one of the FC power generated and output by the FC unit 100 and the battery power stored in the battery system 40 (powering operation). In addition, the motor 12 generates power using kinetic energy of the fuel cell vehicle when the fuel cell vehicle decelerates (regenerative operation).

As an example, the brake device 16 includes a brake caliper, a cylinder that transmits hydraulic pressure to the brake caliper, and an electric motor (all not illustrated) that generates hydraulic pressure in the cylinder. The brake device 16 may include, as a backup, a mechanism that transmits hydraulic pressure generated by the operation of the brake pedal to the cylinder via the master cylinder.

The brake device 16 is not limited to the above-described configuration, and may be an electronically controlled hydraulic brake device that transmits the hydraulic pressure of the master cylinder to the cylinder.

As an example, the vehicle sensor 20 includes an accelerator opening sensor, a vehicle speed sensor, and a brake depression amount sensor (all not illustrated).

The accelerator opening sensor is attached to an accelerator pedal, which is an example of an operation member that receives an acceleration instruction from a driver, detects an operation amount of the accelerator pedal, and outputs the operation amount to the control device 50 as an accelerator opening.

The vehicle speed sensor includes, for example, a speed sensor and a speed calculator (both not illustrated) attached to each vehicle wheel, integrates wheel speeds detected by the wheel speed sensor to derive a speed (vehicle speed) of the fuel cell vehicle, and outputs the speed to the control device 50.

The brake depression amount sensor is attached to the brake pedal, detects an operation amount of the brake pedal, and outputs the operation amount to the control device 50 as a brake depression amount.

The converter 32 is a bidirectional converter that converts a voltage between a DC voltage and an AC voltage. A DC side terminal of the converter 32 is connected to the DC link DL. The battery system 40 is connected to the DC link DL via the BTVCU 34. The converter 32 converts the DC voltage boosted by the BTVCU 34 into a three-phase AC voltage and supplies the three-phase AC voltage to the motor 12. In addition, the converter 32 converts an AC voltage generated by the regenerative operation of the motor 12 into a DC voltage and outputs the DC voltage to the DC link DL. The voltage obtained by the regenerative operation may be referred to as a regenerative voltage.

The BTVCU 34 includes, for example, a step-up/step-down DC voltage converter. The BTVCU 34 outputs a DC voltage obtained by boosting the DC voltage supplied from the battery system 40 to the DC link DL.

Further, the BTVCU 34 steps down the regenerative voltage by the motor 12 or the DC voltage output from the FC unit 100 and outputs the stepped-down voltage to the battery system 40. The voltage output from the FC unit 100 may be referred to as an FC voltage.

As an example, the battery system 40 includes a battery 42, a battery sensor 44, a temperature adjustment unit 46, and an SOC calculation unit 48.

The battery 42 is, for example, a secondary battery such as a lithium ion battery. As an example, the battery 42 stores (has charged therein) regenerative power obtained by the regenerative operation of the motor 12 or FC power obtained by the power generating operation of the FC unit 100, and performs discharging to run the fuel cell vehicle and operate an auxiliary machine group to be described later.

As an example, the battery sensor 44 includes a current sensor, a voltage sensor, a temperature sensor, and the like (all not illustrated). The current sensor, the voltage sensor, and the temperature sensor detect a current value, a voltage value, and a temperature of the battery 42, respectively. The battery sensor 44 outputs a signal indicating the detected current value, voltage value, temperature, and the like to the control device 50.

The temperature adjustment unit 46 includes a heating unit 462 and a cooling unit 464 described later with reference to FIG. 3. The temperature adjustment unit 46 heats or cools the battery 42 using, for example, power supplied from the battery 42 via the BTVCU 34. As an example, the temperature adjustment unit 46 is controlled by a battery electronic control unit (a battery ECU) (not illustrated) so that the temperature of the battery 42 detected by the battery sensor 44 falls within a predetermined temperature range.

The SOC calculation unit 48 calculates the state of charge (SOC) of the battery 42 based on the output of the battery sensor 44. The SOC calculation unit 48 outputs a signal indicating the calculated SOC to the control device 50.

The FC unit 100 includes a fuel cell. In the fuel cell, hydrogen contained in fuel gas as fuel and oxygen contained in air as an oxidant react with each other to generate power. In the embodiment, the FC power from the FC unit 100 is output to the DC link DL. As a result, the FC power from the FC unit 100 is supplied to the motor 12 via the converter 32 or supplied to the battery system 40 via the BTVCU 34. The FC power supplied to the battery system 40 is stored in the battery 42. The configuration of the FC unit 100 will be described later with reference to FIG. 2.

The control device 50 includes a microcomputer including a CPU and a memory connecting to the CPU, and includes an input/output interface such as a timer circuit, an A/D converter, and a D/A converter as necessary. The control device 50 is not limited to include only one control unit, and may include a plurality of control units included in the motor 12, the FC unit 100, the battery system 40, the BTVCU 34, and the like.

In addition to the state of the FC unit 100, the state of the battery 42, and the state of the motor 12, the control device 50 arbitrates and determines the distribution (sharing) of the load to be borne by the FC unit 100, the load to be borne by the battery system 40, and the load to be borne by the motor 12 as a regenerative power source, from the load required of the vehicle system 10 for the entire fuel cell vehicle determined based on inputs (load requests) from various switches and various sensors (not illustrated), or the like and transmits commands to the motor 12, the converter 32, the FC unit 100, the battery system 40, and the BTVCU 34.

As an example, the control device 50 includes a motor control unit 52, a brake control unit 54, and a power control unit 56. As described above, the motor control unit 52, the brake control unit 54, and the power control unit 56 may be replaced with separate control units (for example, the motor ECU, the brake ECU, the battery ECU, and the like).

As an example, the motor control unit 52 calculates a driving force required for the motor 12 based on the output of the vehicle sensor 20, and controls the motor 12 to output the calculated driving force.

As an example, the brake control unit 54 calculates a braking force required for the brake device 16 based on the output of the vehicle sensor 20, and controls the brake device 16 such that it outputs the calculated braking force.

As an example, the power control unit 56 calculates the total required power required for the battery system 40 and the FC unit 100 based on the output of the vehicle sensor 20. The power control unit 56 calculates, for example, a torque to be output by the motor 12 based on the accelerator opening and the vehicle speed, and calculates a total required power by summing a drive shaft required power obtained from the torque and the rotation speed of the motor 12 and a power required by an auxiliary machine or the like to be described later.

In addition, the power control unit 56 calculates a required power for charging and discharging the battery 42 based on the SOC of the battery 42. Then, the power control unit 56 subtracts the required power for charging or discharging of the battery 42 from the total required power (a discharge is set to be positive), calculates the FC required power required for the FC unit 100, and causes the FC unit 100 to generate a power corresponding to the calculated FC required power.

In the embodiment, a minimum value of the power generation amount of the FC unit 100 (referred to as lower limit generated power) is determined so that the FC unit 100 continuously generates power without stopping even if there is no FC required power.

Figure 2:
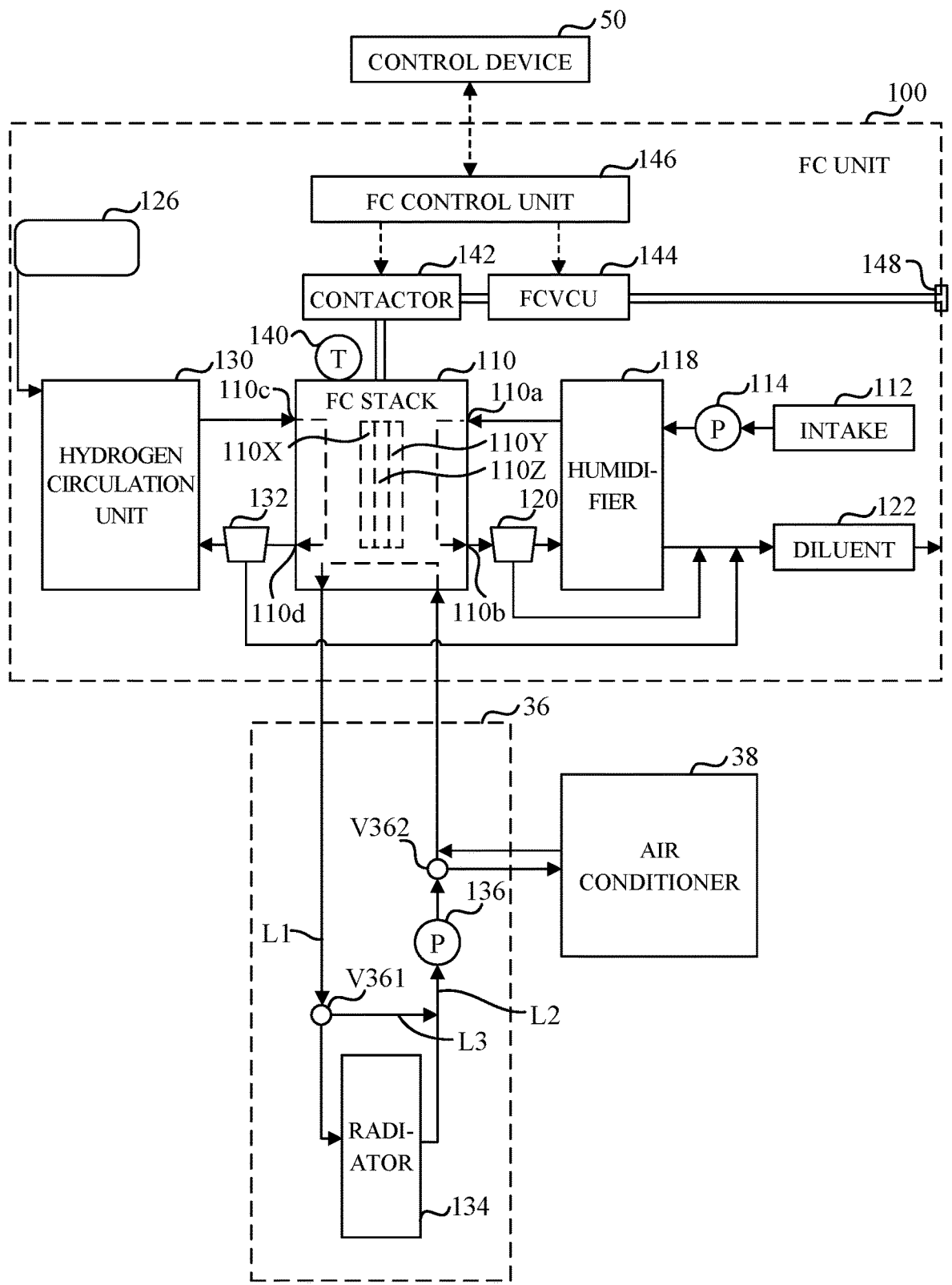
FIG. 2 is a diagram illustrating schematically a configuration of the FC unit of FIG. 1.

FIG. 2 is a schematic configuration diagram illustrating an example of the FC unit 100 and a related device. As an example, the FC unit 100 includes an FC stack 110, an intake 112, an air pump 114, a humidifier 118, a gas-liquid separator 120, a hydrogen tank 126, a hydrogen circulation unit 130, a gas-liquid separator 132, a temperature sensor 140, a contactor 142, a fuel cell voltage control unit (FCVCU) 144, and an FC control unit 146.

The FC unit 100 is connected to the FC cooling device 36, and the FC cooling device 36 is connected to the air conditioner 38.

The FC stack 110 includes a stacked body (not shown) in which a plurality of fuel battery cells are stacked, and a pair of end plates (not shown) sandwiching the stacked body from both sides in the stacking direction.

A fuel battery cell includes a membrane electrode assembly (MEA) and a pair of separators sandwiching the membrane electrode assembly from both sides in a joining direction.

The membrane electrode assembly includes an anode electrode 110X including an anode catalyst and a gas diffusion layer, a cathode electrode 110Y including a cathode catalyst and a gas diffusion layer, and a solid polymer electrolyte membrane 110Z including a cation exchange membrane or the like sandwiched from both sides in a thickness direction by the anode electrode 110X and the cathode electrode 110Y.

A fuel gas containing hydrogen as a fuel is supplied from the hydrogen tank 126 to the anode electrode 110X, and air which is an oxidant gas (reaction gas) containing oxygen as an oxidant is supplied from the air pump 114 to the cathode electrode 110Y.

Hydrogen supplied to the anode electrode 110X is ionized by a catalytic reaction on the anode catalyst, and hydrogen ions move to the cathode electrode 110Y through the appropriately humidified solid polymer electrolyte membrane 110Z. Electrons generated with the movement of hydrogen ions can be extracted to an external circuit (the FCVCU 144 or the like) as a direct current.

Hydrogen ions transferred from the anode electrode 110X onto the cathode catalyst of the cathode electrode 110Y react with oxygen supplied to the cathode electrode 110Y and the electrons on the cathode catalyst to generate water.

The air pump 114 includes a motor driven and controlled by the FC control unit 146, and takes in air from the outside via the intake 112 by the driving force of the motor and compresses the air. The compressed air is sent to the humidifier 118 via an inlet valve (not illustrated). The inlet valve is controlled to open and close by the FC controller 146.

The humidifier 118 humidifies the air compressed by the air pump 114. More specifically, the humidifier 118 includes, for example, a water permeable membrane such as a hollow fiber membrane, and moisture is added to the air by bringing the air from the air pump 114 into contact via the water permeable membrane. The humidified air is supplied from a cathode supply port 110a to the cathode electrode 110Y.

In the gas-liquid separator 120, liquid water and the cathode exhaust gas discharged from a cathode discharge port 110b without being consumed by the cathode electrode 110Y are separated. A part of the cathode exhaust gas separated from the liquid water by the gas-liquid separator 120 is mixed with the air humidified by the humidifier 118 and can be recirculated to the cathode supply port 110a.

Further, the liquid water separated from the cathode exhaust gas by the gas-liquid separator 120 is mixed with the cathode exhaust gas discharged from the cathode discharge port 110b and discharged into the atmosphere through a diluent 122.

The hydrogen tank 126 stores hydrogen in a compressed state. The stored hydrogen is sent to the hydrogen circulation unit 130 via a supply valve (not illustrated). The supply valve is controlled to open and close by the FC control unit 146.

The hydrogen circulation unit 130 supplies hydrogen from the hydrogen tank 126 from an anode supply port 110c to the anode electrode 110X. In addition, the hydrogen circulation unit 130 mixes the anode exhaust gas discharged from an anode discharge port 110d without being consumed by the anode electrode 110X and separated by the gas-liquid separator 132 with hydrogen from the hydrogen tank 126, and recirculates the anode exhaust gas to the anode supply port 110c.

In the gas-liquid separator 132, the anode exhaust gas discharged from the anode discharge port 110d and the liquid water are separated. The liquid water separated from the anode exhaust gas by the gas-liquid separator 132 is mixed with the cathode exhaust gas discharged from the cathode discharge port 110b and discharged to the atmosphere through the diluent 122.

The temperature sensor 140 detects temperatures of the anode electrode 110X and the cathode electrode 110Y of the FC stack 110, and outputs a detection signal to the FC control unit 146.

The contactor 142 is provided between the anode electrode 110X and the cathode electrode 110Y of the FC stack 110 and the FCVCU 144. The contactor 142 electrically connects or disconnects the FC stack 110 and the FCVCU 144 based on a control signal from the FC control unit 146.

The FCVCU 144 includes, for example, a step-up DC voltage converter. The FCVCU 144 is disposed between the contactor 142 and the output terminal 148. The FCVCU 144 boosts the voltage of the output terminal 148 to which the electrical load is connected to the target voltage determined by the FC control unit 146. As a result, the voltage output from the FC stack 110 is boosted to the target voltage and is output from the output terminal 148. The output terminal 148 includes a positive electrode and a negative electrode.

The FC cooling device 36 functions as a first auxiliary machine to be described later. The FC cooling device 36 cools the FC unit 100 by circulating the cooling water through the FC unit 100. The FC cooling device 36 uses, as cooling water, a coolant liquid whose insulation property is improved by removing ions in the cooling water by an ion exchange device or the like (not shown).

An electric water pump 136 sends the cooling water to the FC unit 100 via a second branch control valve V362. The cooling water heated in the FC unit 100 by the heat generation of the FC unit 100 is sent to a radiator 134 via a first branch control valve V361. The radiator 134 cools the cooling water heated in the FC unit 100.

The FC cooling device 36 includes a bypass flow path L3 that bypasses the radiator 134 and connects a flow path L1 on the upstream side of the radiator 134 and a flow path L2 on the downstream side. The first branch control valve V361 is an electromagnetic switching valve for switching between allowing communication or blocking between the flow path L1 and the bypass flow path L3 according to a command from the control device 50. When the flow path L1 and the bypass flow path L3 communicate with each other via the first branch control valve V361, a part (or all) of the cooling water flows toward the electric water pump 136 via the bypass flow path L3. The bypassed cooling water merges with the cooling water cooled by the radiator 134 and is sent to the electric water pump 136.

For example, in a case where the temperature of the FC unit 100 is lower than a predetermined value, the control device 50 switches the first branch control valve V361 so that the flow path L1 and the bypass flow path L3 communicate with each other. As a result, the cooling of the cooling water by the radiator 134 is suppressed as compared with the case where the communication between the flow path L1 and the bypass flow path L3 is interrupted, and the warm-up of the FC unit 100 is promoted.

In the embodiment, the configuration is such that the cooling water cooled by the radiator 134 can be heated by the air conditioner 38. More specifically, the flow path L2 is provided with the second branch control valve V362 that is switched to allow the communication between or blocking between the flow path L2 and the air conditioner 38 in accordance with a command from the control device 50. When the flow path L2 communicates with the air conditioner 38 via the second branch control valve V362, a part (or all) of the cooling water flows to the air conditioner 38. The cooling water having flowed through the air conditioner 38 is heated by the air conditioner 38, returns to the FC cooling device 36 side, joins the cooling water of the FC cooling device 36, and is sent to the electric water pump 136. As a result, the heat generated by the air conditioner 38 can be discarded by the radiator 134 of the FC cooling device 36.

The same coolant liquid is used for the cooling water in the FC cooling device 36 and the hot water circulating in the air conditioner 38.

Further, in a case where the air conditioner 38 is set to heating, the control device 50 switches the second branch control valve V362 such that the flow path L2 communicates with the air conditioner 38 in a state where the temperature of the cooling water of the FC cooling device 36 is equal to or higher than a predetermined value. As a result, the heat generated in the FC unit 100 can be used for raising the temperature of the warm air supplied to the vehicle interior in the air conditioner 38.

In the embodiment, the control device 50 causes the FC cooling device 36 (particularly, the electric water pump 136) to function as a first auxiliary machine to be described later, thereby consuming a surplus of power generated by the vehicle system 10.

Figure 3:
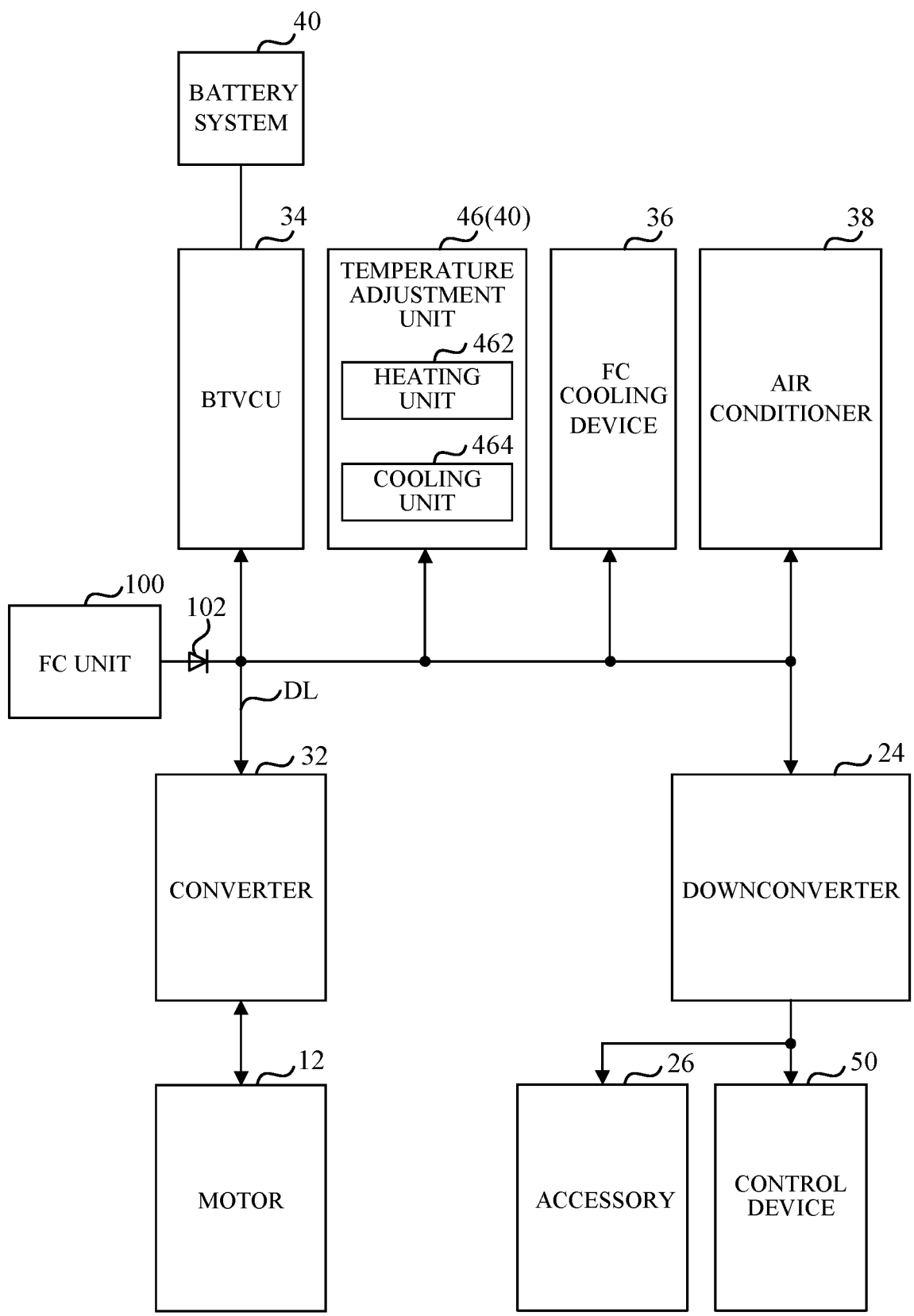
FIG. 3 is a block diagram of a power system of the fuel cell vehicle of FIG. 1.

FIG. 3 is a block diagram of a power system of the fuel cell vehicle. As described above, the vehicle system 10 drives the motor 12 using at least one of the FC power from the FC unit 100 and the battery power stored in the battery system 40. In addition, the vehicle system 10 stores the regenerative power generated at the time of regeneration from the motor 12 and the lower limit generated power of the FC unit 100 in the battery system 40. Then, when the charge restriction of the battery system 40 is required (in other words, it is difficult to store regenerative power or the like due to insufficient free capacity), the vehicle system 10 operates an electric device called an auxiliary machine to consume the surplus of power. The necessity of the charge restriction is determined based on, for example, the SOC of the battery 42 and the temperature of the battery 42.

The auxiliary machine in the embodiment includes the temperature adjustment unit 46 of the battery system 40, the FC cooling device 36, the air conditioner 38, an accessory 26, and the control device 50.

The FC power and the regenerative power are supplied to the temperature adjustment unit 46 of the battery system 40, the FC cooling device 36, and the air conditioner 38 as auxiliary machines, and are also supplied to the accessory 26 and the control device 50 via a downconverter 24.

The downconverter 24 includes, for example, a step-down DC voltage converter, and converts the FC voltage, the battery voltage, and the regenerative voltage into voltages required by the accessory 26 and the control device 50. The accessory 26 is a general term for electrical components that do not directly affect traveling of the fuel cell vehicle, for example.

In the embodiment, the temperature adjustment unit 46 and the air conditioner 38 are referred to as second auxiliary machines. The temperature adjustment unit 46 of the second auxiliary machine may be referred to as a third auxiliary machine. The downconverter 24, the accessory 26, and the control device 50 are referred to as a fourth auxiliary machine.

Figure 4A:
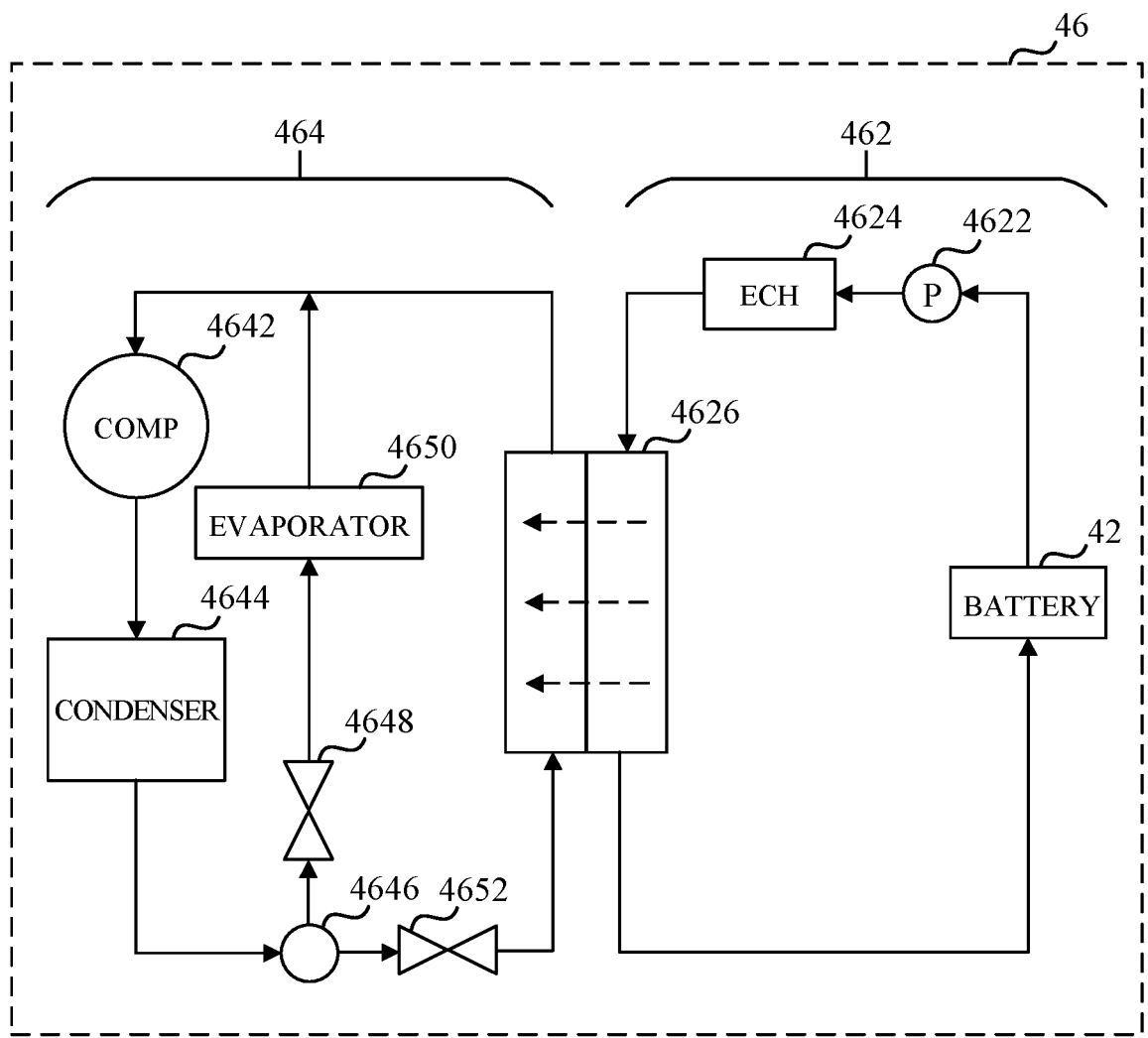
FIG. 4A is a block diagram illustrating a configuration of a main part of a temperature adjustment unit of FIG. 1.

FIG. 4A is a block diagram illustrating a configuration of a main part of the temperature adjustment unit 46 of the battery system 40. The temperature adjustment unit 46 includes a heating unit 462 that heats the battery 42 and a cooling unit 464 that cools the battery 42, and performs heat exchange via a chiller 4626.

The heating unit 462 heats the battery 42 by circulating warm water (coolant liquid). Circulating water sent from an electric water pump 4622 is heated by an electric coolant heater (ECH) 4624 and circulates in the heating unit 462.

The control device 50 performs, for example, energization control for the ECH 4624 and flow rate control for the electric water pump 4622 based on temperature information of the battery 42 detected by the battery sensor 44 of the battery system 40.

The cooling unit 464 cools the battery 42 by circulating a low-temperature refrigerant to cool the hot water on the heating unit 462 side via the chiller 4626. It is also possible to cool the battery 42 with the air cooled by passing through an evaporator 4650.

More specifically, an electric compressor 4642 converts the refrigerant into a high-temperature and high-pressure gas, and the refrigerant is cooled by a condenser 4644 exposed to outside air. When a motor-controlled expansion valve 4652 is opened, the low-temperature refrigerant circulates in the cooling unit 464 through the chiller 4626. On the other hand, when a motor-controlled expansion valve 4648 is opened, the low-temperature refrigerant circulates in the cooling unit 464 through the evaporator 4650.

The control device 50 performs flow rate control for the electric compressor 4642 and drive control for the expansion valve 4652 and the expansion valve 4648 based on temperature information of the battery 42 detected by the battery sensor 44.

In the embodiment, the heat generated in the heating unit 462 can be dissipated by the cooling unit 464. More specifically, the refrigerant on the cooling unit 464 side is warmed up via the chiller 4626 by the heat of the hot water heated by the ECH 4624. The heat of the heated refrigerant is dissipated from the condenser 4644 at the circulation destination.

In this manner, the control device 50 causes the temperature adjustment unit 46 to function as the second auxiliary machine (or the third auxiliary machine) described above, thereby consuming the surplus of the power generated by the vehicle system 10.

Figure 4B:
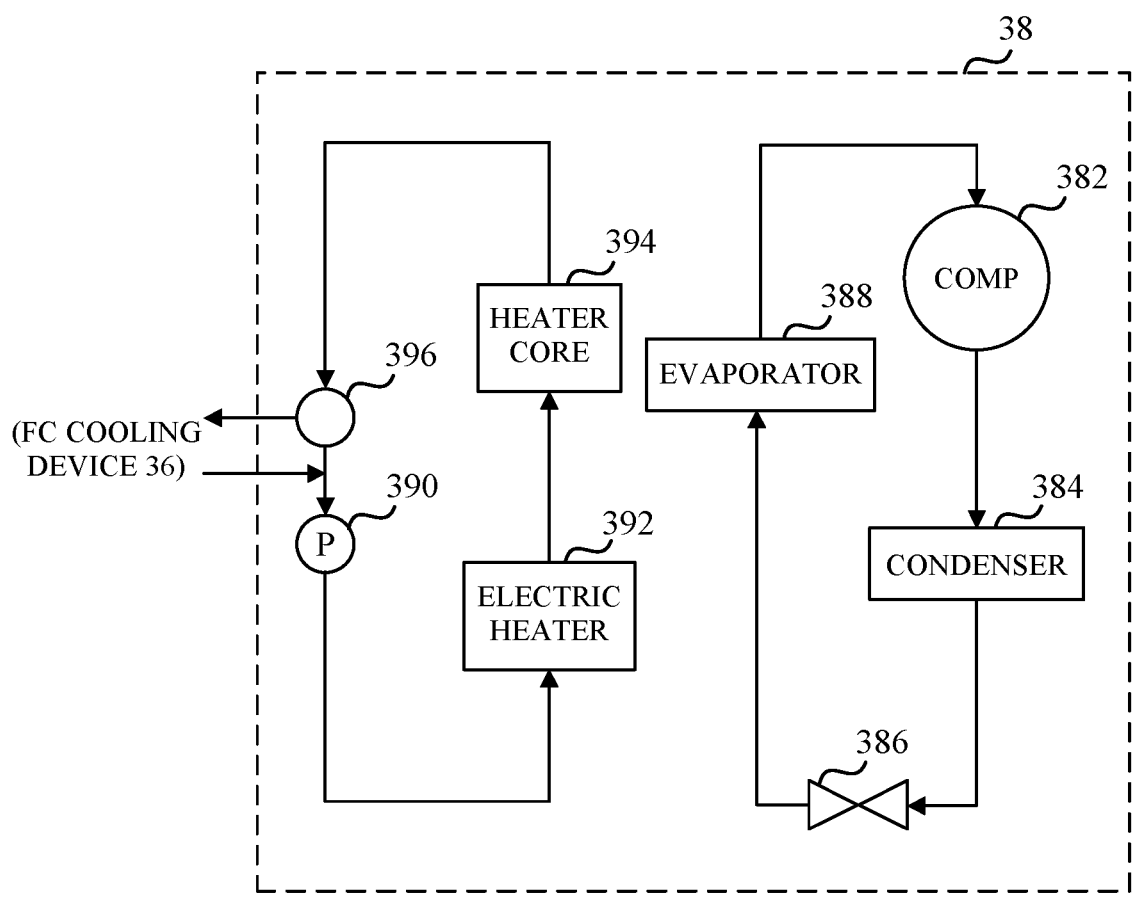
FIG. 4B is a block diagram illustrating a configuration of a main part of an air conditioner of FIG. 2.

FIG. 4B is a block diagram illustrating a configuration of a main part of the air conditioner 38. The air conditioner 38 includes an electric compressor 382 that compresses a refrigerant, a condenser 384 through which outside air flows around, an expansion valve 386 that is electrically controlled, an evaporator 388 that cools air in a vehicle interior, an electric water pump 390 that circulates water in a circulation circuit, an electric heater 392, a heater core 394, and a branch control valve 396 that is electrically controlled, and adjusts a temperature in the vehicle interior.

More specifically, the refrigerant is brought into a gaseous state at a high temperature and a high pressure by the electric compressor 382, and then cooled by the condenser 384. When the expansion valve 386 is opened, low-temperature refrigerant circulates through the evaporator 388. The air in the vehicle interior is cooled by the evaporator 388.

On the other hand, the circulating water sent from the electric water pump 390 is heated by the electric heater 392 and circulated to the heater core 394. The air cooled by the evaporator 388 is heated to a predetermined temperature by being in contact with the heater core 394 and returned to the vehicle interior.

The control device 50 performs, for example, flow rate control for the electric compressor 382, drive control for the expansion valve 386, energization control for the electric heater 392, and flow rate control for the electric water pump 390 based on temperature information from a temperature sensor (not illustrated) and information on a temperature set by an occupant.

In the embodiment, hot water (circulating water) heated by the electric heater 392 can be cooled by the FC cooling device 36 by switching the branch control valve 396. More specifically, when the control device 50 switches the branch control valve 396 to communicate the air conditioner 38 and the FC cooling device 36, a part (or all) of the hot water flows to the FC cooling device 36. The hot water is cooled by the FC cooling device 36, and then joins the hot water of the air conditioner 38 to flow to the electric water pump 390.

In this manner, the control device 50 causes the air conditioner 38 (in particular, the electric water pump 390 and the electric heater 392) to function as the second auxiliary machine described above, thereby consuming the surplus of the electric power generated by the vehicle system 10.

As described above, in the vehicle system 10, the supply destinations of the FC power supplied from the FC unit 100, the battery power supplied from the battery system 40, and the regenerative power supplied from the motor 12 are determined by the control device 50.

In addition, the control device 50 determines an auxiliary machine that consumes surplus power when surplus power is generated in at least one of the FC power from the FC unit 100 and the regenerative power from the motor 12. In other words, the control device 50 determines the power consumption mode to determine the auxiliary machine that consumes the surplus power.

An example of processing in which the control device 50 determines the destination to consume the surplus power will be described with reference to a flowchart of FIG. 5. As an example, when the FC unit 100 starts power generation, the control device 50 repeatedly executes the processing according to FIG. 5.

In S10 (S: processing step), the control device 50 determines whether the charge restriction of the battery 42 is necessary. The criterion for determining the necessity of the charging restriction may be a different value depending on the FC power output from the FC unit 100, the power consumable by the auxiliary machine, and the like. In a case where the charge restriction is necessary, the control device 50 makes an affirmative determination in S10 and proceeds to S20. On the other hand, in a case where the charge restriction is unnecessary, the control device 50 makes a negative determination in S10 and proceeds to S30. In the case of proceeding to S30, the control device 50 determines that the consumption of the surplus power is unnecessary (in other words, no electric power (surplus electric power) that cannot be stored in the battery system 40 due to the shortage of the free capacity is generated), and ends the processing according to FIG. 5.

In many cases where affirmative determination is made in S10, the FC power output from the FC unit 100 is suppressed to the lower limit generated power. In S20, the control device 50 determines whether the first auxiliary machine can be used to consume surplus power. For example, in a case where the power consumption of the first auxiliary machine can be increased to an amount corresponding to surplus power by further increasing the rotation speed of the electric water pump 136 included in the FC cooling device 36 as the first auxiliary machine, the control device 50 makes an affirmative determination in S20 and proceeds to S40. In addition, in a case where the power consumption of the first auxiliary machine cannot be increased to the amount corresponding to surplus power, the control device 50 makes a negative determination in S20 and proceeds to S90.

In a case where an affirmative determination is made in S20, the control device 50 proceeds to the processing of the first mode (S40 to S80). The first mode may be referred to as a first power consumption mode.

In S40, the control device 50 determines whether the surplus power is FC power and regenerative power. In a case where the surplus power is generated in both the FC power and the regenerative power, the control device 50 makes an affirmative determination in S40 and proceeds to S50. On the other hand, in a case where the surplus power is generated in either the FC power or the regenerative power, the control device 50 makes a negative determination in S40 and proceeds to S60.

Figure 5:
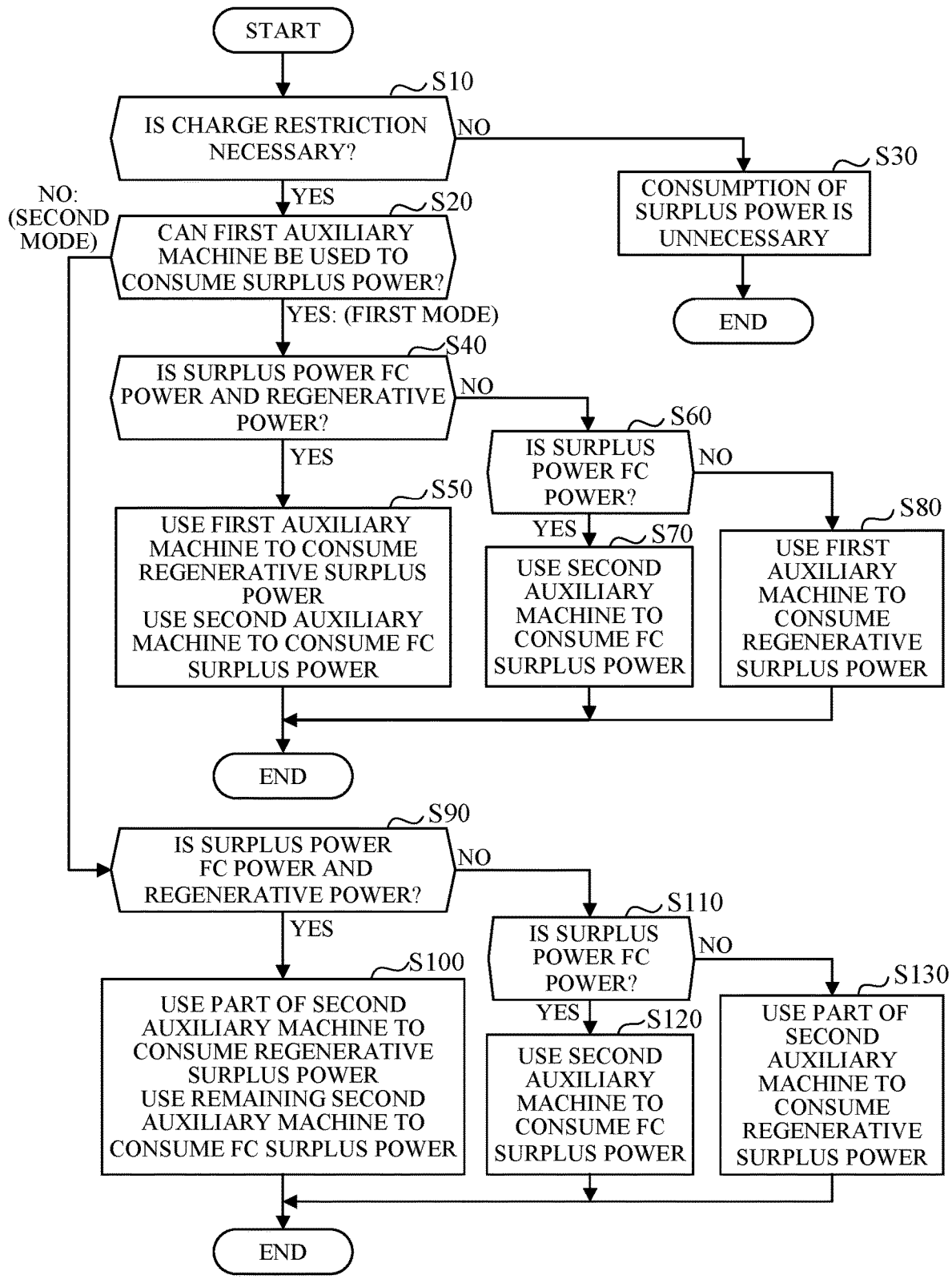
FIG. 5 is a flowchart illustrating a processing of determining where to consume a surplus power.

In S50, the control device 50 determines to use the FC cooling device 36 as the first auxiliary machine to consume the surplus generated in the regenerative power (sometimes referred to as regenerative surplus power), determines to use the air conditioner 38 and the temperature adjustment unit 46 as the second auxiliary machines to consume the surplus generated in the FC power (sometimes referred to as FC surplus power), and ends the processing according to FIG. 5.

In S60, the control device 50 determines whether the surplus power is FC power. In a case where the surplus power is generated in the FC power, the control device 50 makes an affirmative determination in S60 and proceeds to S70. On the other hand, in a case where the excess power is generated in the regenerative power, the control device 50 makes a negative determination in S60 and proceeds to S80.

In S70, the control device 50 determines to use the air conditioner 38 and the temperature adjustment unit 46 as the second auxiliary machines for the consumption of the FC surplus power, and ends the processing according to FIG. 5.

In S80, the control device 50 determines to use the FC cooling device 36 as the first auxiliary machine for the consumption of the regenerative surplus power, and ends the processing according to FIG. 5.

In a case where a negative determination is made in S20, the control device 50 proceeds to the processing of the second mode (S90 to S130). The second mode may be referred to as a second power consumption mode.

In S90, the control device 50 determines whether the surplus power is FC power and regenerative power. In a case where the surplus power is generated in both the FC power and the regenerative power, the control device 50 makes an affirmative determination in S90 and proceeds to S100. On the other hand, in a case where the surplus power is generated in either the FC power or the regenerative power, the control device 50 makes a negative determination in S90 and proceeds to S110.

In S100, the control device 50 determines to use the air conditioner 38, which is a part of the second auxiliary machine, for the consumption of the regenerative surplus power, and determines to use the temperature adjustment unit 46, which is the remaining second auxiliary machine, for the consumption of the FC surplus power, and ends the processing according to FIG. 5.

In S110, the control device 50 determines whether the surplus power is FC power. In a case where the surplus power is generated in the FC power, the control device 50 makes an affirmative determination in S110 and proceeds to S120. In addition, in a case where the surplus power is generated in the regenerative power, the control device 50 makes a negative determination in S110 and proceeds to S130.

In S120, the control device 50 determines to use the air conditioner 38 as the second auxiliary machine and the temperature adjustment unit 46 as the second auxiliary machine for the consumption of the FC surplus power, and ends the processing according to FIG. 5.

In S130, the control device 50 determines to use the air conditioner 38, which is a part of the second auxiliary machine, for the consumption of the regenerative surplus power, and ends the processing according to FIG. 5.

According to the embodiments described above, the following operations and effects are obtained.

(1) The vehicle system 10 mounted on a vehicle driven by the motor 12 includes the FC unit 100 as a fuel cell, the battery system 40 as a power storage device that stores FC power as a first power generated by the FC unit 100 and regenerative power as a second power regenerated by the motor 12, the FC cooling device 36 as a first auxiliary machine and the temperature adjustment unit 46 and the air conditioner 38 as a second auxiliary machine that are driven by using at least one of the FC power, the regenerative power, and the battery power as third power stored in the battery system 40, and the control device 50 that determines an auxiliary machine that consumes surplus of the FC power and the regenerative power (FIG. 3). The control device 50 determines the power consumption mode to determine the auxiliary machine that consumes the surplus in the FC power and the regenerative power. That is, when a surplus is generated in at least one of the FC power and the regenerative power, the control device 50 determines switching of the power consumption mode between the first power consumption mode in which the surplus in the regenerative power is consumed by the FC cooling device 36 and the surplus in the FC power is consumed by the temperature adjustment unit 46 and the air conditioner 38 and the second power consumption mode in which the surplus in the FC power and the regenerative power is consumed by the temperature adjustment unit 46 and the air conditioner 38 (FIG. 5).

With this configuration, in the first power consumption mode, the first auxiliary machine and the second auxiliary machine share and consume the surplus of power, and in the second power consumption mode, the second auxiliary machine consumes the surplus of power. As a result, for example, even when the first auxiliary machine cannot consume the surplus of power, the vehicle system 10 can appropriately consume the surplus of power.

(2) In a case where the FC cooling device 36 cannot be used to consume the surplus power, the control device 50 determines switching of the power consumption mode to the second power consumption mode (FIG. 5).

With this configuration, the vehicle system 10 can appropriately consume the surplus of power.

(3) The second auxiliary machine includes a plurality of auxiliary machines (for example, the air conditioner 38 and the temperature adjustment unit 46) (FIG. 3). In the second power consumption mode, the control device 50 determines that one auxiliary machine (for example, the air conditioner 38) of the plurality of auxiliary machines consumes the surplus of the regenerative power, and an auxiliary machine (for example, the temperature control unit 46) different from the auxiliary machine that consumes the surplus of the regenerative power consumes the surplus of the FC power (FIG. 5).

With such a configuration, in the second power consumption mode, the surplus of power can be shared and consumed by the plurality of auxiliary machines constituting the second auxiliary machine, so that the surplus of power can be appropriately consumed as the vehicle system 10. If the surplus of the regenerative power is consumed by the air conditioner 38 and the temperature adjustment unit 46 without sharing, a situation in which the auxiliary machine that consumes the surplus of the FC power becomes insufficient may occur. However, since the air conditioner 38 and the temperature adjustment unit 46 share and consume the surplus of power, the surplus of both the FC power and the regenerative power can be appropriately consumed.

(4) The second auxiliary machine includes the air conditioner 38 in the vehicle interior and the temperature adjustment unit 46 that regulates temperatures of the battery system 40 (FIG. 3). In the second power consumption mode, the control device 50 determines that the surplus of the regenerative power is consumed by the air conditioner 38 and the surplus of the FC power is consumed by the temperature adjustment unit 46 (FIG. 3).

With such a configuration, since the surplus of power can be shared and consumed by the air conditioner 38 and the temperature adjustment unit 46 constituting the second auxiliary machine, the surplus of power can be appropriately consumed as the vehicle system 10.

(5) The temperature adjustment unit 46 includes the heating unit 462, the cooling unit 464, and the chiller 4626 as a heat exchange unit provided between the heating unit 462 and the cooling unit 464, and radiates heat generated in the heating unit 462 to consume surplus power from the cooling unit 464 via the chiller 4626 (FIG. 4A).

With such a configuration, it is possible to appropriately radiate heat generated by consuming surplus power.

(6) The first auxiliary machine includes the FC cooling device 36 that cools the FC stack 110 of the FC unit 100, and the FC cooling device 36 and the air conditioner 38 are connected to dissipate the heat generated in the air conditioner 38 to consume the surplus power from the FC cooling device 36 (FIG. 2).

With such a configuration, it is possible to appropriately radiate heat generated by consuming surplus power.

(7) The control device 50 acquires SOC and temperature information of the battery 42 of the battery system 40, and determines whether it is necessary to consume surplus power based on the SOC and the temperature information.

With this configuration, it is possible to appropriately determine the possibility of generating surplus power that cannot be stored in the battery system 40.

The above embodiment can be varied into various forms. Several modifications will be described below. In the above second power consumption mode, the air conditioner 38 consumes the surplus power generated in the regenerative power and the temperature adjustment unit 46 consumes the surplus power generated in the FC power. However, the temperature adjustment unit 46 may consume the surplus power generated in the regenerative power and the air conditioner 38 may consume the surplus power generated in the FC power.

In the above embodiment, the temperature adjustment unit 46 of the battery system 40 and the air conditioner 38 in the vehicle interior are configured as the second auxiliary machine. However, one of the temperature adjustment unit 46 and the air conditioner 38 and other auxiliary machine may be configured as the second auxiliary machine, and a plurality of auxiliary machines other than the temperature adjustment unit 46 and the air conditioner 38 may be configured as the second auxiliary machine.

In the above embodiment, the FC cooling device 36 that cools the FC stack 110 of the FC unit 100 is configured as the first auxiliary machine. However, other auxiliary machine other than the FC cooling device 36 may be configured as the first auxiliary machine.

The above embodiment can be combined as desired with one or more of the above modifications. The modifications can also be combined with one another.

According to the present invention, it is possible to appropriately consume surplus power in generated power and regenerative power.

Above, while the present invention has been described with reference to the preferred embodiments thereof, it will be understood, by those skilled in the art, that various changes and modifications may be made thereto without departing from the scope of the appended claims.

What is claimed is:

1. A vehicle system mounted on a vehicle driven by an electric motor, comprising:
    a fuel cell;
    a power storage device that stores a first power generated by the fuel cell and a second power regenerated by the electric motor;
    a first auxiliary machine and a second auxiliary machine driven by using at least one of the first power, the second power and a third power stored in the power storage device;
    a power control unit that calculates a required power required for the fuel cell and that controls the fuel cell so that the fuel cell generates a power corresponding to the required power; and
    an electronic control unit including a microprocessor and a memory connected to the microprocessor, wherein
    the microprocessor is configured to perform
        determining an auxiliary machine consuming a surplus power in the first power and the second power, when the surplus power generates in at least one of the first power and the second power,
        switching of a power consumption mode between a first power consumption mode where the surplus power in the second power is consumed by the first auxiliary machine and the surplus power in the first power is consumed by the second auxiliary machine and a second power consumption mode where the surplus power in the first power and the second power is consumed by the second auxiliary machine, and
        the switching including switching of the power consumption mode to the second power consumption mode when the first auxiliary machine is unavailable for consuming of the surplus power.

2. The vehicle system according to claim 1, wherein
the second auxiliary machine includes a plurality of auxiliary machines, and
the microprocessor is configured to perform
the determining including determining the auxiliary machine so that in the second power consumption mode, the surplus power in the second power is consumed by one of the plurality of auxiliary machines and the surplus power in the first power is consumed by another auxiliary machine of the plurality of auxiliary machines.

3. The vehicle system according to claim 2, wherein
the second auxiliary machine includes an air conditioner in a vehicle interior and a temperature adjustment unit regulating a temperature of the power storage device, and
the microprocessor is configured to perform
the determining including determining the auxiliary machine so that the surplus power in the second power is consumed by the air conditioner and the surplus power in the first power is consumed by the temperature adjustment unit.

4. The vehicle system according to claim 3, wherein
the temperature adjustment unit includes a heating unit, a cooling unit, and a heat exchange unit provided between the heating unit and the cooling unit and is configured to radiate heat generated in the heating unit operated to consume the surplus power, from the cooling unit through the heat exchange unit.

5. The vehicle system according to claim 3, wherein
the first auxiliary machine includes a cooling device cooling the fuel cell, and
the cooling device and the air conditioner are connected to radiate heat generated in the air conditioner operated to consume the surplus power, from the cooling device.

6. The vehicle system according to claim 5, further comprising
an openable and closable valve provided in a flow path connecting the cooling device and the air conditioner so that a cooling water flows toward the air conditioner after flowing through the cooling device.

7. The vehicle system according to claim 3, wherein
the air conditioner includes an electric compressor compressing a refrigerant, an electric pump circulating a water in a circulation circuit, and an electric heater heating the water.

8. The vehicle system according to claim 1, wherein
the microprocessor is configured to further perform:
acquiring information on a state of charge and a temperature of the power storage device; and
determining whether it is necessary to consume the surplus power based on the information on the state of charge and the temperature.

9. The vehicle system according to claim 1, wherein
the power control unit is configured to control the fuel cell so that the fuel cell generates a lower limit power even when there is no required power.

* * * * *